US008015820B2

(12) United States Patent
Harris et al.

(10) Patent No.: US 8,015,820 B2
(45) Date of Patent: Sep. 13, 2011

(54) GAS TURBINE ENGINE EXHAUST COMPONENT AND MANUFACTURING METHOD OF SAME

(75) Inventors: Andrew H. Harris, Manchester, CT (US); Raymond E. Konikowski, Riverton, CT (US)

(73) Assignee: United Technologies Corporation, Hartford, CT (US)

( * ) Notice: Subject to any disclaimer, the term of this patent is extended or adjusted under 35 U.S.C. 154(b) by 688 days.

(21) Appl. No.: 12/132,157

(22) Filed: Jun. 3, 2008

(65) Prior Publication Data

US 2009/0313825 A1 Dec. 24, 2009

(51) Int. Cl.
*F02K 1/00* (2006.01)

(52) U.S. Cl. ..................................... 60/770; 239/265.39

(58) Field of Classification Search ............... 415/211.2, 415/220; 60/770; 239/265.19, 265.39
See application file for complete search history.

(56) References Cited

U.S. PATENT DOCUMENTS

| | | | | | |
|---|---|---|---|---|---|
| 2,008,002 | A | * | 7/1935 | Calkins | 29/243.517 |
| 2,009,022 | A | * | 7/1935 | Maul | 101/58 |
| 2,010,010 | A | * | 8/1935 | Chillas, Jr. | 261/114.1 |
| 2,466,827 | A | * | 4/1949 | Roth | 138/39 |
| 2,815,643 | A | * | 12/1957 | Geary et al. | 239/265.39 |
| 3,254,487 | A | * | 6/1966 | Baehr | 60/770 |
| 3,625,626 | A | * | 12/1971 | Lester | 415/114 |
| 3,704,499 | A | | 12/1972 | Majkrzak et al. | |
| 3,837,580 | A | * | 9/1974 | Camboulives et al. | 239/265.39 |
| 3,892,358 | A | * | 7/1975 | Gisslen | 239/265.39 |
| 4,696,431 | A | | 9/1987 | Buxe | |
| 4,813,230 | A | | 3/1989 | Braithwaite | |
| 4,852,232 | A | | 8/1989 | Wells | |
| 5,012,853 | A | | 5/1991 | Bihlmaier | |
| 5,215,257 | A | * | 6/1993 | Barcza | 239/265.39 |
| 5,385,015 | A | | 1/1995 | Clements et al. | |
| 5,667,140 | A | * | 9/1997 | Johnson et al. | 239/265.33 |
| 5,779,152 | A | * | 7/1998 | Renggli et al. | 239/265.33 |
| 6,070,830 | A | | 6/2000 | Mueller et al. | |
| 6,276,126 | B1 | * | 8/2001 | Bouiller et al. | 60/232 |
| 6,935,118 | B2 | | 8/2005 | Gould et al. | |
| 7,043,898 | B2 | | 5/2006 | Rago | |
| 7,096,661 | B2 | * | 8/2006 | Bush et al. | 60/232 |
| 7,223,068 | B2 | * | 5/2007 | Horng et al. | 415/187 |
| 7,231,716 | B2 | | 6/2007 | Verilli | |
| 7,546,742 | B2 | * | 6/2009 | Wakeman et al. | 60/796 |
| 7,587,899 | B2 | * | 9/2009 | Song et al. | 60/771 |
| 7,762,086 | B2 | * | 7/2010 | Schwark | 60/796 |

* cited by examiner

*Primary Examiner* — William H Rodríguez
(74) *Attorney, Agent, or Firm* — Carlson, Gaskey & Olds

(57) ABSTRACT

A gas turbine exhaust component, such as an exhaust nozzle, is provided that includes circumferential ribs arranged along a longitudinal axis. Longitudinal strakes are supported by the circumferential ribs and arranged about the longitudinal axis. Fastening elements are used to secure the longitudinal strakes to one another to provide a desired exhaust component contour. In one example, fastening elements are used to secure the longitudinal strakes to the circumferential ribs using a bracket. The longitudinal strakes are preformed into the desired exhaust component contour, using low cost forming methods. The longitudinal strakes are formed to fit the circumferential ribs and provide the desired exhaust component contour. The longitudinal strakes are secured to one another to maintain the desired exhaust component contour. The longitudinal strakes may be provided by a low cost steel, in one example.

10 Claims, 3 Drawing Sheets

GASPATH

FABRICATE RIBS
FORM STRAPS
FIT STRAPS TO RIBS
SECURE STRAPS TO RIBS
SECURE STRAPS TO ONE ANOTHER

GAS TURBINE ENGINE EXHAUST COMPONENT AND MANUFACTURING METHOD OF SAME

BACKGROUND

This disclosure relates to a gas turbine exhaust component and a method of manufacturing the same.

Some gas turbine engines, in particular military turbojet engines, utilize exhaust nozzles having nonsymmetrical contours. That is, the exhaust nozzle is not symmetrical about at least one plane within which the longitudinal axis of the exhaust nozzle lies. Generally, exhaust nozzles are arranged downstream from augmentor ducts in some military turbojets. These types of exhaust nozzles are expensive to manufacture, but the cost is spread over a relatively large number of productions units. On the other hand, in some demonstrator engines, exhaust nozzles are manufactured in low volumes. The low manufacturing volumes of demonstrator engines, particularly those with non-symmetrical contours, make it difficult to provide exhaust nozzles in a cost effective manner.

Generally, exhaust nozzles for demonstrators are fabricated from sections of aerospace material such as, but not limited to, titanium or nickel that are welded together. These sections are generally fabricated using tools such as forming tools used in high volume production. These types of fabrication tools may generally cost up to several million dollars, resulting in very large non-reoccurring expenditures for the tooling, welding, weld fixtures and post-weld heat treat and stress relief, and weld inspection. Because the exhaust nozzles for demonstrators are generally amortized over one or two sets of engine hardware, the non-reoccurring expenditures are costly relative to the amount of fabrication making it difficult to obtain competitive work for a demonstrator or technology program where cost is a considered as significant factor.

The fabricated and/or welded sections are generally secured by welding the sections to prefabricated circumferential ribs that are arranged at the exterior of the sections. Due to distortions from welding, inner surfaces of the circumferential ribs are generally subjected to additional grinding or machining to fit or accommodate the longitudinal sections. This additional fitting adds further labor and cost to the exhaust nozzles. What is needed is a lower cost exhaust nozzle manufacturing method capable of producing non-symmetrical exhaust nozzle contours.

SUMMARY

A gas turbine exhaust component, such as an exhaust nozzle, is provided that includes circumferential ribs arranged along a longitudinal axis. Longitudinal strakes are supported by the circumferential ribs and arranged about the longitudinal axis. In one example, the longitudinal strakes are secured to the circumferential ribs prior to securing the longitudinal strakes to one another. Fastening elements, such as rivets, braze or welds, are used to secure the longitudinal strakes to one another to provide a desired exhaust component contour. In one example, fastening elements, such as rivets or welds, may also be used to secure the longitudinal strakes to the circumferential ribs using a bracket.

The exhaust nozzle is manufactured by providing the circumferential ribs, which is machined to a final dimension at the outset of the assembly process. The longitudinal strakes are preformed into the desired exhaust component contour, using low cost forming methods, such as implementation of a drop hammer or an English wheel. The longitudinal strakes are formed to fit the circumferential ribs and provide the desired exhaust component contour. The inner surface of the circumferential ribs need not be trimmed during fitting of the longitudinal strakes to the circumferential ribs. The longitudinal strakes are secured to one another to maintain the desired exhaust component contour. The longitudinal strakes may be provided by a low cost steel, in one example.

These and other features of the application can be best understood from the following specification and drawings, the following of which is a brief description.

DETAILED DESCRIPTION OF THE DISCLOSED EMBODIMENT

Figure 1:
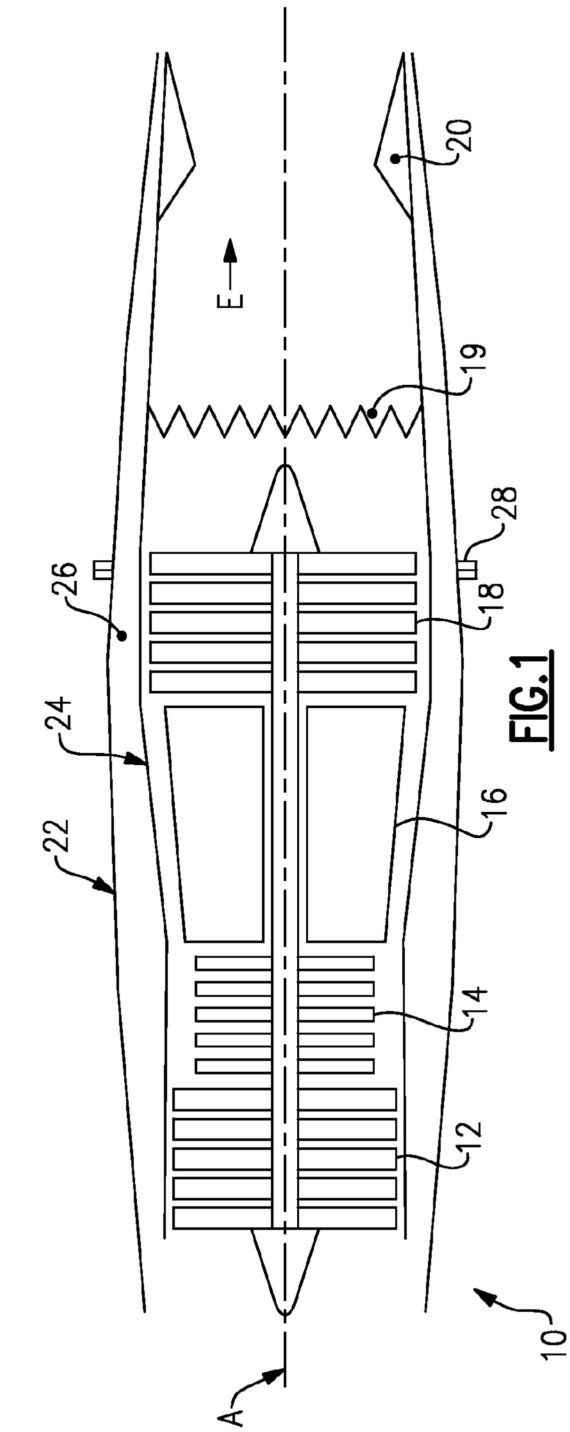
FIG. 1 is a highly schematic view of an example turbojet engine.
Figure 2:
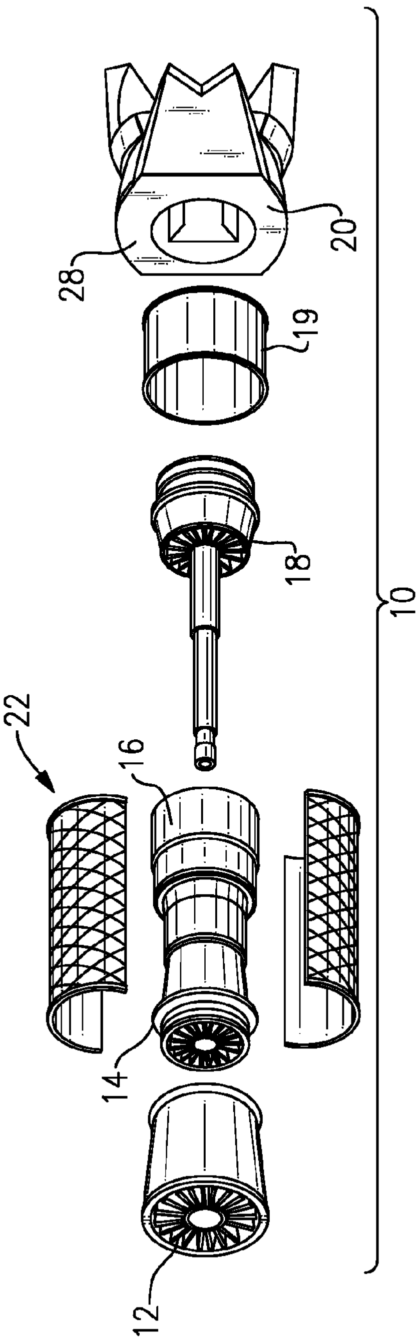
FIG. 2 is a schematic view of an exploded turbojet engine.

FIGS. 1 and 2 illustrate an example gas turbine engine such as, but not limited to, a turbojet engine 10. The engine 10 sections generally includes a fan section 12, a compressor section 14, a combustor section 16, a turbine section 18, an augmentor 19 and an exhaust nozzle 20. The compressor section 14, combustor section 16 and turbine section 18 are generally referred to as the core engine. A rotational axis A of the engine 10 is essentially disposed and extends longitudinally through the sections. An outer engine duct structure 22 and an inner cooling liner structure 24 provide an annular secondary fan bypass flow path 26 around a primary exhaust flow path E. The exhaust nozzle 20 may be secured to the augmentor 19 by a flange 28. As can be appreciated by the illustration of the exhaust nozzle 20 in FIG. 2, exhaust nozzle contours can be rather complex and have a non-symmetrical contour. As a result, numerous sections may be assembled to provide a desired complex and/or non-symmetrical contour for the exhaust nozzle 20.

Figures 3, 4, 5, 5A, 6, 6A, 7:
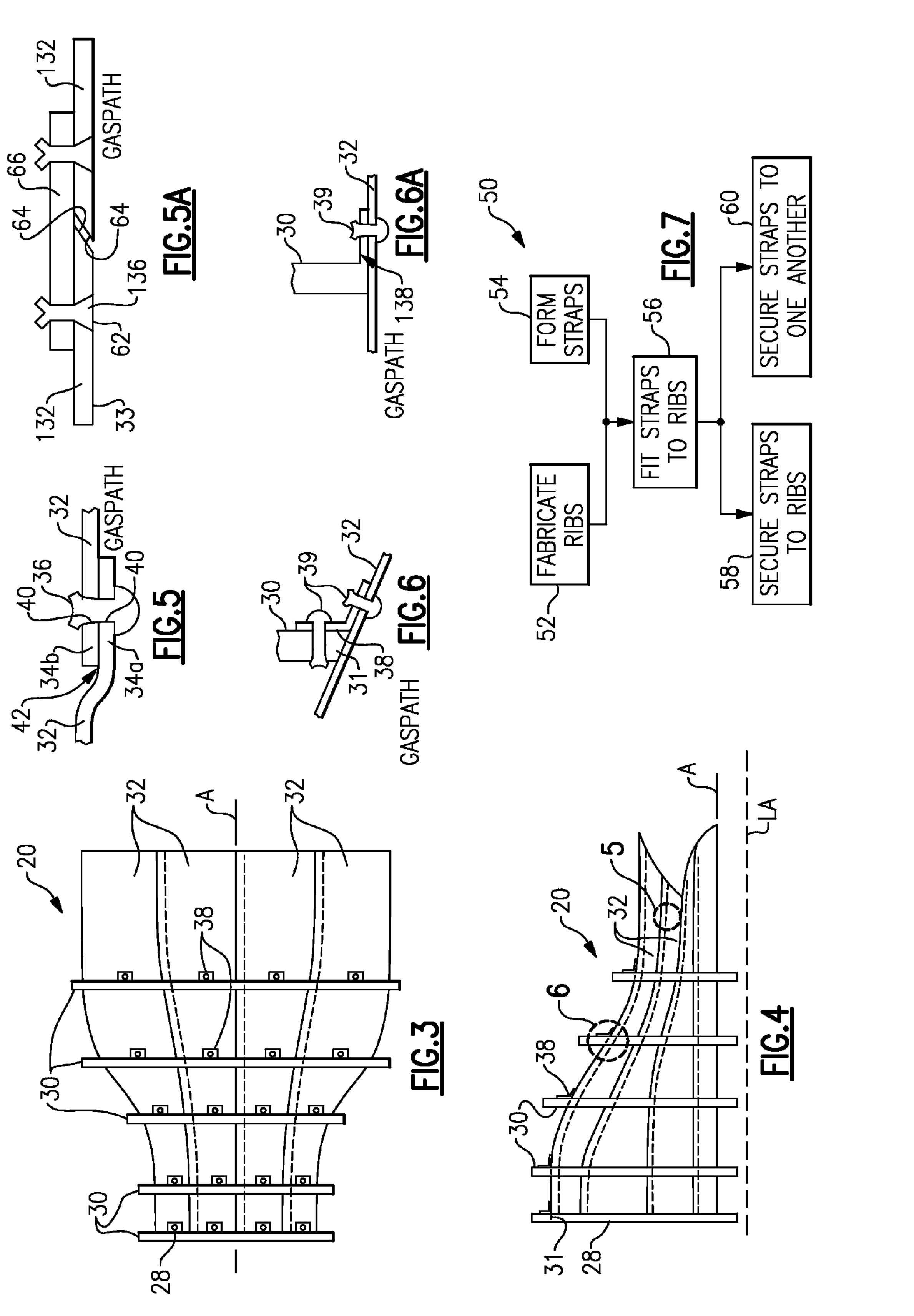
FIG. 3 is a top elevational view of an example exhaust nozzle manufactured according to one example manufacturing process.
FIG. 4 is a side elevational view of the exhaust nozzle shown in FIG. 3.
FIG. 5 is an enlarged partially broken view of an area of the exhaust nozzle shown at 5 in FIG. 4.
FIG. 5A is an enlarged partially broken view of another example exhaust nozzle.
FIG. 6 is an enlarged partially broken view of an area of the exhaust nozzle shown at 6 in FIG. 4.
FIG. 6A is an example circumferential rib with an integrated bracket.
FIG. 7 is a flow chart depicting an example manufacturing process used to form the example exhaust nozzle.

Referring to FIGS. 3 and 4, the exhaust nozzle 20 includes multiple circumferential ribs 30 that are arranged longitudinally along the axis A to facilitate forming the basic geometric framework for the exhaust nozzle 20. In one example, the inner surface of the circumferential ribs 30 are pre-machined, such as by milling or by water jet, plasma or laser cutting, to a final contour at the outset of an assembly process. As a result, radial inner surfaces 31 of the circumferential ribs 30 need not be machined during assembly to accommodate variations in the longitudinal strakes 32 as will be discussed in greater detail below. One of the circumferential ribs 30 may be used as the flange 28, for example. A longitudinal axis LA of the exhaust nozzle 20 may be offset from the rotational axis A, for example.

Multiple longitudinal strakes 32 are preformed to facilitate assembly of a desired exhaust component contour. The longitudinal strakes 32 each extend lengthwise and have a length substantially greater than their width, for example. In one example, the longitudinal strakes 32 are fabricated from a formable material such as, but not limited to, mild steel or stainless steel. The circumferential ribs 30 may also be fabricated from steel, if desired. Using non-aerospace materials enables the exhaust nozzle 20 to be produced at a non-aerospace shop having metal forming skills, but with lower overhead. The contour of the longitudinal strakes 32 can be formed using any suitable metal forming method. For example, a drop hammer or an English wheel can be used. The longitudinal strakes 32 are form-fitted to the circumferential ribs 30 to a desired exhaust component contour.

Because the longitudinal strakes 32 are not welded to one another prior to fitment to the circumferential ribs 30 in the example shown in FIGS. 3-6, distortion from welding is not a concern. This enables the circumferential ribs 30 to be used without additional machining to its inner surfaces 31. Once the longitudinal strakes 32 are formed to the inner surface 31 of the circumferential ribs 30, the longitudinal strakes 32 can be secured to one another and to the circumferential ribs 30.

In one example shown in FIG. 5, portions **34*a*, 34*b* of the longitudinal strakes 32 are arranged in an overlapping relationship with one another. One of the longitudinal strakes 32 can be deformed using a flanging tool to provide a depression 42, for example, to receive the other portion 34*b* of the other longitudinal strake 32. Apertures 40 are provided in the portions 34*a*, 34*b* and a fastening element 36, such as a rivet, is provided in the apertures 40 to secure the portions 34*a*, 34*b* to one another. In an example shown in FIG. 5A, longitudinal strakes 132 include complementary, adjacent beveled edges 64 providing a joint. A backing plate 66 overlaps the joint and secures the longitudinal strakes 132 to one another with rivets 136. In this example, heads 62 of the rivets 136 are flush with the inner surface 33**, which is exposed to the gaspath, to improve aerodynamic flow within the gaspath.

Referring to FIG. 6, the longitudinal strakes 32 are secured to the circumferential ribs 30, in one example, using an attachment member 38, such as a bracket. Alternatively, a bracket 138 may be integral with the circumferential rib 30, as shown in FIG. 6A. In the example shown in FIG. 6, the inner surface 31 of the circumferential rib 30 is machined at the outset to provide a beveled surface to accommodate the angled longitudinal strake 32 that the circumferential rib 30 supports. In one example, fastening elements 39 such as rivets facilitate securing the longitudinal strakes 32 and the circumferential ribs 30 to one another via the attachment member 38.

A manufacturing process 50 is illustrated in FIG. 7. In one example, inner surfaces 31 of circumferential ribs 30 are fabricated or machined to a desired final contour at the outset of the assembly process, as indicated at block 52. The longitudinal strakes 32 are preformed to a desired exhaust component contour, as indicated at block 54. The longitudinal strakes 32 are fitted to the inner surfaces 31 of the circumferential ribs 30 to provide the desired exhaust component contour, as indicated at block 56. Once the desired exhaust component contour has been achieved, the longitudinal strakes 32 are secured to the circumferential ribs 30 using fastening elements 39, as indicated at block 58. Fastening elements 36 are also used to secure the longitudinal strakes 32 to one another, as indicated at block 60.

Figure 8:
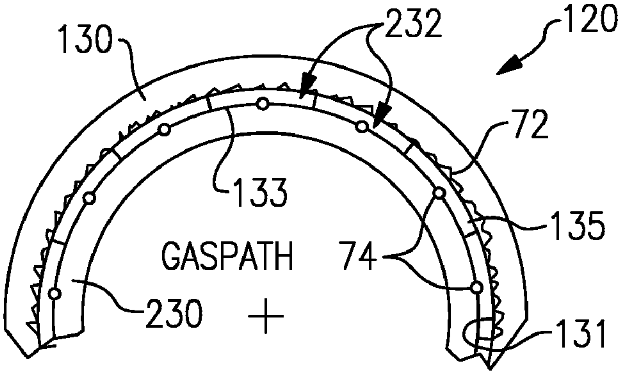
FIG. 8 is a cross-sectional view taken along line 8-8 of an example exhaust nozzle shown in FIG. 9 manufactured according to another example manufacturing process.
Figure 9:
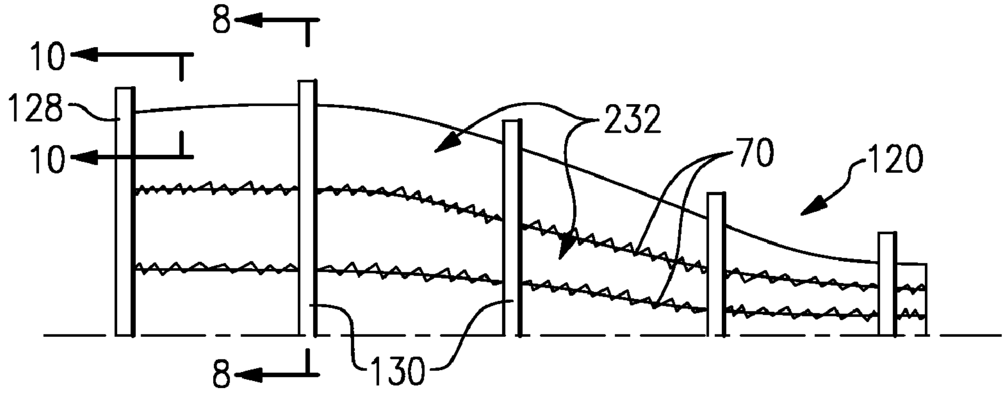
FIG. 9 is a side elevational view of the example exhaust nozzle.
Figure 10:
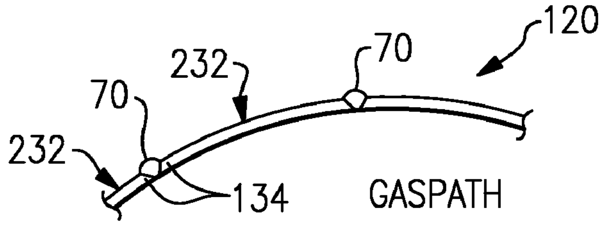
FIG. 10 is a cross-sectional view of the exhaust nozzle in FIG. 8 taken along line 10-10.

Referring to FIGS. 8-10, another example exhaust nozzle 120 manufactured according to the process 50 is shown. Circumferential ribs 130 and flange 128 are provided in a manner similar to the embodiment shown in FIGS. 3 and 4. An inner circumferential rib 230 is arranged at radially inward facing surfaces 133 of the longitudinal strakes 132.

Adjacent portions 134 of adjoining longitudinal strakes 232 are secured to one another by, for example, a seam weld 70 running generally in the direction of flow within the exhaust nozzle 120. The circumferential ribs 130, 230 securely retain the longitudinal strakes 232 prior to seam welding to minimize distortion. As shown in FIG. 8, radially outward facing surfaces 135 of the longitudinal strakes 232 can be secured to the inner surfaces 131 of the circumferential ribs 130 by a weld 72, which permanently attaches the longitudinal strakes 232 to the circumferential rib 130. The inner circumferential rib 230 can be temporarily secured to the inner surface of the longitudinal strakes 232 by tack welds 74. The tack welds 74 can be ground off so that the inner circumferential rib 230 can be removed to provide an unobstructed flow of the exhaust through the exhaust nozzle 120 during use. As a result, elimination or reduction of subsequent manufacturing steps such as heat treating and additional metal forming to address distortion is facilitated.

Although example embodiments have been disclosed, a worker of ordinary skill in this art would recognize that certain modifications would come within the scope of the claims. For that reason, the following claims should be studied to determine their true scope and content.

What is claimed is:

1. A gas turbine exhaust component comprising:

circumferential ribs arranged along a longitudinal axis;

longitudinal strakes supported by the circumferential ribs and arranged about the longitudinal axis, the longitudinal strakes arranged to provide an exhaust nozzle having an continuous, permanent, fixed inner surface providing a desired exhaust nozzle contour that is configured to be exposed to an exhaust gas path; and fastening elements securing the longitudinal strakes to one another.

2. The gas turbine exhaust component according to claim 1, wherein the longitudinal strakes abut an inner surface of the circumferential ribs.

3. The gas turbine exhaust component according to claim 1, wherein the longitudinal strakes include longitudinally extending portions overlapping one another, the fastening element securing the overlapping portions to one another.

4. The gas turbine exhaust component according to claim 1, wherein the desired exhaust component contour provides an exhaust nozzle.

5. The gas turbine exhaust component according to claim 1, wherein the longitudinal strakes are constructed from a steel material.

6. The gas turbine exhaust component according to claim 1, wherein the desired exhaust component contour provides a singular, fixed contour.

7. The gas turbine exhaust component according to claim 1, wherein the inner surface is generally frustoconical in shape.

8. A gas turbine exhaust component comprising:

circumferential ribs arranged along a longitudinal axis;

longitudinal strakes supported by the circumferential ribs and arranged about the longitudinal axis; and fastening elements securing the longitudinal strakes to one another to provide a desired exhaust component contour, wherein the fastening elements are rivets.

9. A gas turbine exhaust component comprising:

circumferential ribs arranged along a longitudinal axis;

longitudinal strakes supported by the circumferential ribs and arranged about the longitudinal axis; and fastening elements securing the longitudinal strakes to one another to provide a desired exhaust component contour, wherein the fastening elements are longitudinal seam welds.

10. A gas turbine exhaust component comprising:

circumferential ribs arranged along a longitudinal axis;

longitudinal strakes supported by the circumferential ribs and arranged about the longitudinal axis; and fastening elements securing the longitudinal strakes to one another to provide a desired exhaust component contour, wherein adjoining longitudinal strakes include adjacent edges providing a joint, and a backing plate overlapping the joint and secured to the adjoining longitudinal strakes with fastening elements.

* * * * *